Dec. 27, 1938.  G. A. SWENSON  2,141,567
STONE-WORKING TOOL
Filed May 11, 1938
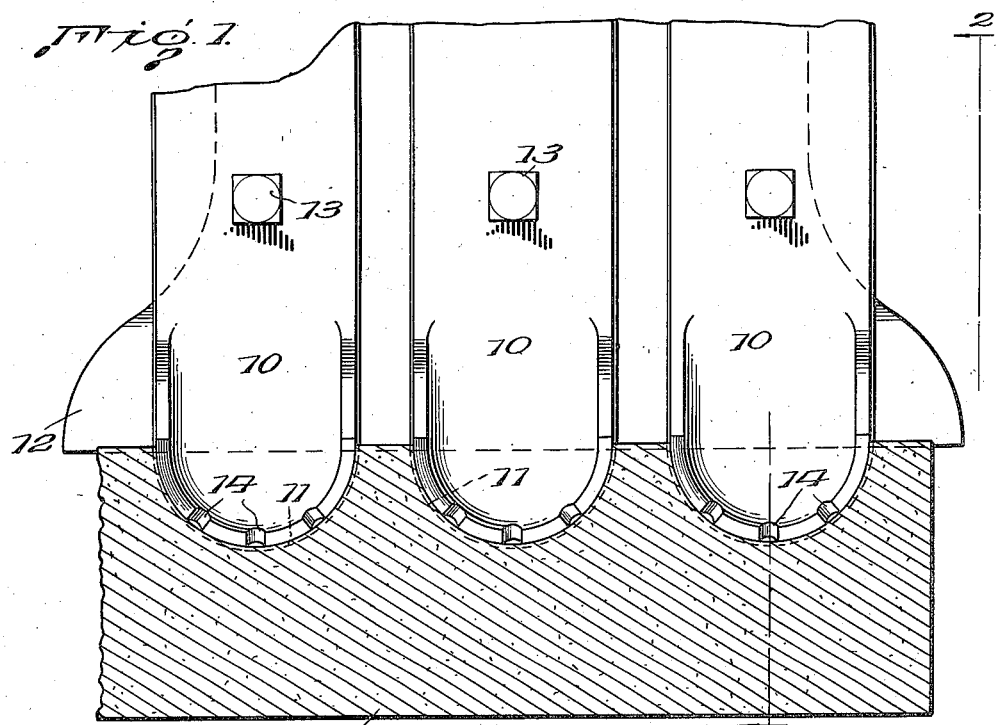
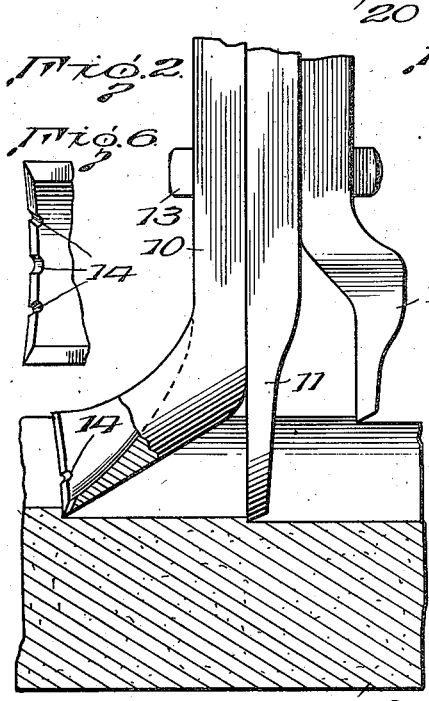
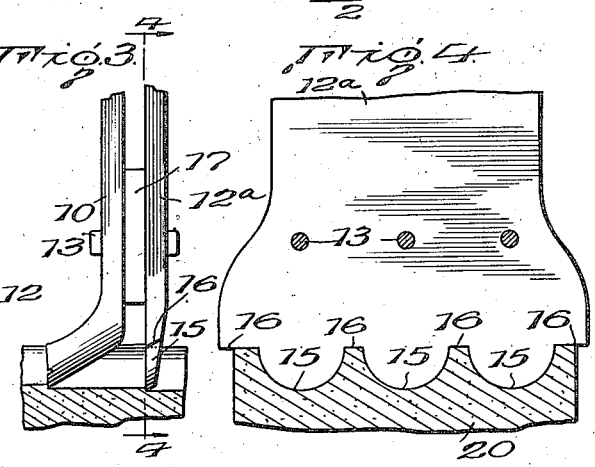
Inventor
Gustave A. Swenson,
By Chuck & Chuck
His Attorneys Patented Dec. 27, 1938

2,141,567

UNITED STATES PATENT OFFICE 2,141,567

STONE-WORKING TOOL

Gustave A. Swenson, Champaign, Ill.

Application May 11, 1938, Serial No. 207,395

3 Claims. (Cl. 125—38)

This invention relates to improvements in stone-working appliances and, particularly, to a stone-cutting tool.

One object of the invention is to minimize the time required to cut and finish off the surface of a design in or on the surface of a stone. More specifically, the invention contemplates the provision of a stone-cutting tool capable of cutting more deeply into a stone, or with which increased quantities may be cut from the surface of a stone in producing a given design on the surface thereof without danger of chipping or fracturing the stone to a point beyond the line or depth to which it is intended to cut the stone in forming the desired design or pattern.

Another object of the invention is to minimize the time required in the several cutting and dressing or surface-finishing operations, such as first roughing-out the surface for the design and then finishing off both the cut and uncut portions of the surface, by providing a tool assembly consisting of the roughing-out tool and finishing tool or tools so that the finished stone can be produced without loss of time in substituting one tool for another.

A still further object of the invention is to provide a stone-working tool having one or more recesses in its cutting edge, the purpose of these recesses being to permit the tool to cut to a greater depth without fracturing the stone below or beyond the proposed finished surface of the design being cut in the stone. Preferably, the wall of each recess in the cutting edge of the tool is also beveled to form a cutting edge thereon. With a tool of this character, the operator can cut more deeply into the stone without chipping the stone beyond the contemplated line of the pattern, by reason of the fact that the recessed cutting edge causes the stone chips to crumble or break up so that excessively large pieces are not removed from any one portion of the stone surface.

With these and other objects in view, the invention consists in certain details of construction and combinations and arrangements of parts, all as will hereinafter be more fully described and the novel features thereof particularly pointed out in the appended claims.

In the accompanying drawing—

Figure 1 illustrates one form of the present tool assembly in front elevation, with the stone which is being operated upon shown in cross-section;

Fig. 2 is a view, partly in elevation and partly in section, taken on the line 2—2 of Fig. 1;

Fig. 3 is a similar view of a modified tool assembly;

Fig. 4 is a view taken on the line 4—4 of Fig. 3;

Fig. 5 is a perspective view illustrating one form of roughing-out tool having the edge thereof recessed in accordance with the present invention; and Fig. 6 is a detail top plan view of the cutting edge of the roughing-out tool illustrating the concave formation of said edge.

In the form of invention illustrated in Figs. 1 and 2, the tool assembly comprises tools of a form which would be used in producing a fluted surface on the stone 20, but it will be appreciated that the present invention may be incorporated in tools for cutting other designs in a stone. This particular so-called fluting tool assembly consists of a roughing-out tool 10, a flute-finishing tool 11, and a second finishing tool 12, the purpose of the roughing-out tool being to remove or rough-out the greater portion of the material that must be cut away to form the groove or flute while the flute-finishing tool 11 smooths or finishes off the surface of the flute or groove and the finishing tool 12 finishes off the surface of the stone between adjacent flutes. It will also be appreciated that the tool assembly may consist of one or more roughing-out tools and flute-finishing tools. For instance, Fig. 1 illustrates a stone 20 and an assembly consisting of three roughing-out tools which are referred to in the industry as gouges, it being understood that there is a flute-finishing tool 11 behind each gouge, as indicated by the dotted lines in Fig. 1. Where a plurality of gouges and flute-finishing tools are used in the assembly, the finishing tool 12 will be of a width sufficient to finish off the plane surface of the stone between contiguous flutes as well as at the sides beyond the end flutes in the series of flutes formed by the tool. The several tools are preferably but not necessarily rigidly locked or secured together in the assembly by bolts 13 and, in ordinary use, this assembled tool will be carried or clamped in a suitable stock for cooperation with the ordinary planer bed used in the stone-cutting industry. As previously indicated, each of the gouges or roughing-out tools 10 has its concave cutting edge formed with one or more notches or recesses, the number of recesses varying with and being dependent upon the width or size of the tool, wider tools naturally having a larger number of recesses therein than a comparatively narrow tool. These recesses, indicated at 14, are preferably, but not necessarily, of arcuate or curved contour. It is also preferred that the wall of each recess be beveled to form an operative cutting edge on that wall. Where the beveled surface is provided on the wall of the recess, the inclination of the bevel preferably corresponds to the inclination of the bevel on the cutting edge proper of the tool. With a notched or recessed cutting edge on the roughing-out tool, it has been found that the stone, in each operation or movement of the tool along the stone surface, can be cut to a greater depth without danger of the stone chipping or fracturing below the cutting line, so to speak, of the tool. In other words, where the gouge or other roughing-out tool is set to cut the stone along a plane comparatively close to the contemplated finished surface or line of the design, the stone will not be chipped or broken below that contemplated line.

It will be appreciated that so far as the ability of the roughing-out tool to cut to greater depths without chipping or fracturing the stone below the cutting line is concerned, the invention is not necessarily limited to a tool assembly such as disclosed in the present instance, because the roughing-out tool and the finishing tools may be interchangeably and successively used in the tool stock. For instance, instead of using a multiple tool assembly, the recessed gouge or other roughing-out tool may be used by itself and, after the roughing-out operation has been performed, the roughing-out tool could be removed from the stock and replaced by a finishing tool, which would finish off the roughed-out surface. Of course, this would require a greater amount of time, as compared with the time required with the composite tool because with the latter no time is lost in substituting the finishing tool for the roughing-out tool in the tool stock.

Another form of assembly is illustrated in Figs. 3 and 4, in which instance, the flute-finishing tool 11 is combined, so to speak, with the plane-surface finishing tool 12. In this form of assembly, there is only the roughing-out tool 10 and a finishing tool 12ª, the latter, in this instance, having an operating or cutting edge corresponding to the combined surfaces of the flutes formed by the roughing-out tools and the plane surfaces between and at the sides of the several flutes formed by the roughing-out tool. In other words, where three gouges are used with the finishing tool 12ª, the latter will have three semicircular portions 15 to finish off the surfaces of the three flutes and straight-cutting edge portions 16 for finishing off the plane surfaces of the stone. In this form of assembly, the finishing tool 12ª is also made with a straight shank and a spacer block 17 is interposed between the finishing tool and gouge in order to provide ample clearance between the two tools to permit ready escape of stone chips from between the two tools.

In actual practice, it has been found that the present tool assembly greatly minimizes the time required for forming a fluted surface on a stone. Tests have proven that the present tool reduces the time required anywhere from 25% to 50% or more which, of course, is a tremendous saving. This is due to the fact that no time is lost changing tools and the presence of the notches in the cutting edge of the roughing-out tool. It might be added that these notches relieve considerable pressure and cause the spalls to shatter and hence permit the tools to cut deeper.

What I claim is:

1. A stone-working tool assembly comprising a roughing-out gouge having a recessed cutting edge with the wall of each recess beveled to form a cutting edge thereon, a finishing-flute tool secured to the gouge in tandem relation with respect to said gouge, and cutting means associated with said gouge and flute finishing tool for finishing the surface of a stone between flutes cut therein by said gouge.

2. A stone-working tool assembly comprising the roughing-out gouge having a recessed cutting edge, the walls of said recesses also having a cutting edge provided thereon, said gouge being adapted to roughly cut a flute in the surface of a stone, and a finishing tool rigidly secured to said gouge, said finishing tool having a stone-working edge conforming to the surface of the flute cut in the stone and the surface of the stone adjacent the two side extremities of the flute.

3. A stone-working tool assembly comprising a roughing-out tool having a recessed cutting edge of a contour to roughly form the desired design on the surface of a stone, the wall of each recess being beveled to form a cutting edge thereon, a finishing tool secured to the roughing-out tool in tandem relation with respect to said roughing-out tool, said finishing tool having a contour corresponding to the contour of the design to be formed on the stone, and cutting means associated with said roughing-out tool and finishing tool for finishing the surface of the stone at the side of the design formed on the surface of the stone by said roughing-out and finishing tools.

GUSTAVE A. SWENSON.